United States Patent [19]
Lee

[11] Patent Number: 4,793,976
[45] Date of Patent: Dec. 27, 1988

[54] SULFUR RECOVERY SYSTEM

[75] Inventor: Min-Hsiun Lee, Tulsa, Okla.

[73] Assignee: Amoco Corporation, Chicago, Ill.

[21] Appl. No.: 98,776

[22] Filed: Sep. 18, 1987

Related U.S. Application Data

[63] Continuation of Ser. No. 944,706, Dec. 19, 1986, abandoned, which is a continuation of Ser. No. 727,493, Apr. 26, 1985, abandoned, which is a continuation of Ser. No. 544,335, Oct. 21, 1983, Pat. No. 4,533,529.

[51] Int. Cl.$^4$ .................................................. B01J 8/04
[52] U.S. Cl. ..................................... 422/190; 422/171
[58] Field of Search ............... 422/168, 171, 172, 173, 422/188, 190; 423/230, 244 R, 539, 563, 574, 576; 55/74

[56] References Cited

U.S. PATENT DOCUMENTS

| | | | |
|---|---|---|---|
| 4,044,114 | 8/1977 | Dezael et al. | 423/574 R |
| 4,088,736 | 5/1978 | Courty et al. | 423/574 R X |
| 4,462,977 | 7/1984 | Reed | 423/574 R |
| 4,487,754 | 12/1984 | Reed | 423/574 R |
| 4,507,275 | 3/1985 | Reed | 423/574 R |
| 4,533,529 | 8/1985 | Lee | 423/576 X |

Primary Examiner—G. L. Kaplan
Assistant Examiner—Nam X Nguyen
Attorney, Agent, or Firm—Gary M. Bond; L. Wayne White

[57] ABSTRACT

Sulfur species are removed from a Claus plant tail gas stream by contacting with zinc oxide in the presence of sufficient reducing equivalents for conversion of sulfur compounds to hydrogen sulfide. In another aspect, sulfur compounds are converted to hydrogen sulfide prior to contacting with zinc oxide.

9 Claims, 3 Drawing Sheets

SULFUR RECOVERY SYSTEM

This is a continuation of copending application Ser. No. 944,706 filed on Dec. 19, 1986, abandoned, which is a continuation of 727,493 filed 4.26.85 abandoned which is a continuation of 544,335 filed 10.21.83 now U.S. Pat. No. 4,533,529.

FIELD OF THE INVENTION

The invention relates to the removal of sulfur and sulfur compounds from gaseous streams containing such compounds. In one aspect, the invention relates to the removal of sulfur compounds including sulfur dioxide from Claus plant effluent gas streams. In another aspect, the invention relates to the use of solid high surface area contact materials (sorbents), for example, zinc oxide-based sorbents, for absorbing sulfur compounds such as sulfur dioxide and hydrogen sulfide.

BACKGROUND OF THE INVENTION

A developing area of sulfur recovery technology is that of tail gas cleanup, that is, of removing trace quantities of sulfur compounds from gaseous effluent streams of Claus sulfur plants (Claus tail gas streams). Such gaseous effluent streams may contain substantial quantities of sulfur compounds. For example, gaseous effluent streams from a two-stage Claus or modified Claus plant typically can contain 3–10% of the sulfur present in the acid gas feed to the Claus plant in the form of elemental sulfur, hydrogen sulfide, sulfur dioxide, carbonyl sulfide, carbon disulfide, and the like.

Tail gas cleanup processes have been developed to further remove a large part of the residual sulfur compounds from the Claus tail gas streams to meet current environmental emissions requirements. Among the tail gas cleanup processes are those in which the amount of water vapor present in the gaseous effluent stream is reduced before further treatment. Examples include the Shell Claus Off-Gas Treating (SCOT) Process and the Beavon Sulfur Removal Process (BSRP). Such processes can reduce the water content of the Claus plant effluent stream, normally in the range of about 30-40 mol %, to less than, for example, about 5 mol % to facilitate removal of sulfur compounds from the tail gas. To remove the water, known processes may utilize, for example, reducing gas generators, hydrogenation reactors, and quench towers increasing the capital investment cost and operating cost for these and similar processes. Further, even after the bulk of sulfur compounds are removed from the Claus plant effluent streams by such tail gas treatment, there may remain residual hydrogen sulfide, for example, in the SCOT process, which must be converted to a suitable form for release to the atmosphere by, for example, incineration of residual sulfur compounds to sulfur dioxide (SO2) Such processes are reported capable of overall sllfur recoveries as high as 99.75%. However, to achieve such high levels of recovery, chemical (amine) absorption or oxidation, with attendant costs and operating and disposal problems must be used.

Removal of water from the gaseous stream after hydrogenation, while significantly facilitating the removal of hydrogen-sulfide, results in disadvantages associated with such water removal. First, of course, are the equipment costs required for water removal. Further, maintenance costs are significant because, for example, the mixture of hydrogen sulfide with water is a corrosive mixture which can require pH control and other methods to reduce corrosivity. Yet further, in the event of breakdown in the hydrogenation step, sulfur dioxide may be introduced along with the hydrogen sulfide into the water removal step forming an even more corrosive mixture. Greatly desirable therefore would be processes and systems capable of achieving a high level of recovery from Claus plant gaseous effluent streams which would eliminate the requirement of a water removal step.

Further, the use of, for example, chemical (amine) absorption or oxidation processes, such as for example, Beavon Stretford, to achieve extremely high overall sulfur recovery levels can entail high investment and energy costs, especially for regeneration, as well as expensive chemicals. Portions of these chemicals may be degraded and result in nonregenerable streams. Consequently, alternative processes which can ameliorate or eliminate some or all of these disadvantages are highly desirable.

To date, such processes have not been made available. Beavon, Canadian Pat. No. 916,897 (1972), for example, deals with using iron oxide for removal of residual sulfur from Claus plant tail gas to increase the overall recovery of sulfur to a level of 99%. Such level of recovery by itself, of course, is not suffiient to meet today's extremely low sulfur emission requirements. Courty, et al., U.S. Pat. No. 4,088,736 (1978), for example, deals with a zinc oxide based absorbent for use in removing hydrogen sulfide from industrial gases, and mentions as an example of such industrial gases, a Claus plant effluent stream. However, Courty, et al., apparently did not appreciate that Claus plant tail gas streams also contain sulfur dioxide which must be removed to meet emission requirements nor do Courty, et al., propose a procedure by which such removal can be accomplished.

It has been known for some years that metallic oxides such as iron oxide and zinc oxide are capable of absorbing hydrogen sulfide with the formation of sulfides in the purification of coal-derived gases. (See, for example, Britton, et al., U.S. Pat. No. 4,175,928 (1979), and Grindley and Steinfeld, "Development and Testing of Regenerable Hot Coal Gas Desulfurization Sorbents," Paper Presented at Second Annual Contractors Meeting on Contaminant Control in Hot Coal-Derived Gas Streams, Morgantown, West Virginia, February 17–19 (1982)). Nevertheless, similar processes have not been applied to the treatment of Claus plant tail gas streams as hereinafter described to achieve a Claus tail gas cleanup process capable of 99.97% overall sulfur recovery and higher while eliminating the need discussed above for chemical (amine) absorption or oxidation as required, for example, on the SCOT and BSRP processes, to obtain such levels of recovery, or to achieve a Claus tail gas cleanup process which can eliminate the need for a water removal and incineration steps and the attendant construction and operating problems discussed above.

Highly desirable are economic and effective Claus tail gas cleanup processes which do not require water removal and/or incineration and yet would be capable of meeting stringent air quality control requirements by providing recoveries as high as 99.97% or higher.

SUMMARY OF THE INVENTION

The invention comprises a process and system for removing sulfur compounds, for example, hydrogen sulfide and sulfur dioxide, from a Claus plant gaseous effluent stream to an extremely low level, for example, less than 20 ppm (parts per million) $H_2S$. In this process and system, the sulfur compounds are removed in the presence of sorbent based on zinc oxide as active sorbent (hereinafter referred to as zinc oxide or zinc oxide-based sorbent) to produce a laden (sulfided) sorbent and a purified gaseous stream having on the order of 250 ppm or less total residual $H_2S$ and $SO_2$. Residual $H_2S$ may be reduced to 20 ppm or lower.

In accordance with the process of the invention, a Claus plant gaseous effluent stream containing hydrogen sulfide sulfur dioxide, and reducing equivalents such as hydrogen in an amount sufficient for reducing substantially all sulfur dioxide to hydrogen sulfide is contacted with a zinc oxide sorbent effective in the presence of such hydrogen for the removal of both hydrogen sulfide and sulfur dioxide and for producing an effluent stream of reduced content of sulfur and sulfur compounds.

In one aspect, the invented process is suitable for treating a gaseous effluent stream from a Claus plant comprising a thermal reaction zone and at least one catalytic conversion zone, the gaseous effluent stream comprising at least water, hydrogen sulfide, and sulfur dioxide. Elemental sulfur, organic sulfur compounds such as carbonyl sulfide (COS) and carbon disulfide ($CS_2$), carbon dioxide ($CO_2$), nitrogen ($N_2$), and other compounds, can also be present. In addition, there is present or is added sufficient hydrogen or other reducing equivalents for hydrogenation of substantially all sulfur containing compounds to hydrogen sulfide. Substantially all sulfur compounds in the gaseous effluent stream from the Claus plant are then converted by hydrogenation to hydrogen sulfide. The resulting hydrogen sulfide is then contacted with an effective zinc oxide-based sorbent in an absorber zone and hydrogen sulfide is absorbed to produce a laden sorbent. Then, the thus laden sorbent is regenerated producing a regeneration effluent stream. In further steps, the process can comprise returning the thus produced regeneration stream comprising at least one of sulfur dioxide and/or elemental sulfur to a thermal reaction zone or to a catalytic conversion zone in the Claus plant. According to another aspect of the invention, water is not removed from the process stream and the steps of contacting the process stream with the zinc oxide sorbent occurs in the presence of the water present in the Claus tail gas effluent stream.

According to another aspect of the invention, the invention comprises operating a Claus plant having a thermal reaction zone and a catalytic reaction zone (including a sulfur condenser for removing formed elemental sulfur) to produce a gaseous effluent stream comprising water, hydrogen sulfide, and sulfur dioxide (elemental sulfur, organic sulfur compounds, carbon dioxide, and nitrogen can also be present), and sufficient reducing equivalents for hydrogenation of all sulfur compounds present in the gaseous effluent stream to hydrogen sulfide. The thus-produced gaseous effluent stream from the Claus plant can then be treated as described above. Alternatively, the thus-produced gaseous effluent stream can then be heated to a temperature effective for removal of hydrogen sulfide and sulfur dioxide from the gaseous effluent stream in the presence of a zinc oxide sorbent effective for such removal to produce a heated Claus plant effluent stream. The heated Claus plant effluent stream can then be contacted with the zinc oxide sorbent in an absorber zone to remove both hydrogen sulfide and sulfur dioxide. The mechanism by which this simultaneous removal of hydrogen sulfide and sulfur dioxide can occur in a single absorption zone is believed to be by absorption of hydrogen sulfide already present in the Claus gaseous effluent stream on the sorbent accompanied by simultaneously hydrogenating sulfur dioxide and other sulfur compounds present in the gaseous effluent stream to hydrogen sulfide utilizing reducing equivalents present in the gaseous effluent stream followed by absorbing the thus produced hydrogen sulfide on the zinc oxide-based sorbent to additionally produce laden sorbent. Thus the zinc oxide is believed to perform the dual function of acting as a catalyst facilitating hydrogenation of sulfur dioxide and the like, and as an absorbent in absorbing hydrogen sulfide.

In other aspects, the invented process comprises introducing a gaseous effluent stream from a Claus plant into a separate and distinct hydrogenation zone prior to the absorber zone and hydrogenating substantially all sulfur compounds therein and producing a stream containing substantially all of the originally present sulfur compounds in the form of hydrogen sulfide. Optionally, the hydrogenation can be effected after enriching the gaseous effluent stream from the Claus plant with reducing equivalents, if appropriate, sufficient to reduce substantially all sulfur compounds therein to hydrogen sulfide.

Turning attention now to the invented system, in on aspect, the system comprises Claus conversion means for converting hydrogen sulfide into sulfur and for producing an effluent stream containing hydrogen sulfide, sulfur dioxide, and at least sufficient reducing species such as hydrogen for converting substantially all sulfur species in the effluent stream to hydrogen sulfide. Heating means is connected in flow communication with the Claus conversion means for receiving the effluent stream and for heating the effluent stream to a temperature for removal of hydrogen sulfide and sulfur dioxide in the presence of a metal sulfiding absorbent effective for such removal to produce a heated effluent stream. Absorber means is connected in flow communication with the heating means for receiving the heated effluent stream and for removing hydrogen sulfide and sulfur dioxide therefrom in the presence of the zinc oxide sulfiding absorbent catalyst to produce an absorption effluent stream.

According to another aspect, the system of the invention comprises hydrogenation means connected in flow communication with the Claus conversion means for receiving the effluent stream and for converting substantially all sulfur containing species to hydrogen sulfide in the presence of an effective hydrogenation catalyst. The hydrogenation catalyst contains metal(s) selected from the group consisting of Groups VB, VIB, and VIII and the Rare Earth Series of the Periodic Table of the Elements and mixtures of any two or more thereof. The resulting stream containing substantially all of the sulfur compounds present now in the form of hydrogen sulfide can then be provided to absorber means having zinc oxide absorbent therein as described above.

According to another aspect of the invention, the heating means comprises an indirect heat exchanger in which the effluent stream from the conversion means is heated in indirect heat exchange with the absorber effluent stream.

The invention accordingly comprises the processes and systems, together with their steps, parts, and interrelationships which are exemplified in the present disclosure, and the scope of which will be indicated in the appended claims.

DETAILED DESCRIPTION OF THE INVENTION

According to an aspect of the invention, a Claus plant effluent gaseous stream containing hydrogen sulfide, sulfur dioxide, and reducing equivalents such as hydrogen, the hydrogen present in at least a stoichiometric amount sufficient for reducing substantially all of the sulfur dioxide to hydrogen sulfide, is contacted with a zinc oxide sorbent effective in the presence of such hydrogen for producing an effluent stream of reduced sulfur content, and a stream of reduced sulfur content is produced. The hydrogen can be either present in (indigenous to) the gaseous stream or added t the stream from an external source or generated within the stream.

According to an aspect of the invention, substantially all sulfur compounds in a gaseous effluent stream from a Claus plant are converted by hydrogenation to hydrogen sulfide. Claus plant gaseous effluent streams to which the invention is applicable can have varying compositions depending upon the source of the acid gas being treated as well as the operating conditions of the Claus plant. Claus plant effluent streams can include, for example, hydrogen sulfide in the range of about 0.4 to about 2 mol %, sulfur dioxide in the range of about 0.2 to about 2 mol %, water in the range of about 20 to about 50 mol % (typically 30-40 mol %), as well as organic sulfides such as carbonyl sulfide and carbon disulfide, and elemental sulfur.

The reducing equivalents, for example, hydrogen ($H_2$) and carbon monoxide (CO) required for the conversion of the sulfur compounds in the gaseous effluent stream to hydrogen sulfide can be obtained from any convenient source including that present in the gaseous effluent stream as free hydrogen, or available from a donor such as carbon monoxide which will react with water in the presence of a catalyst to yield hydrogen. Molecular hydrogen is preferred, whether contained in the gaseous effluent stream from the Claus plant or internally or externally generated.

According to an aspect of the invention, a Claus plant having a thermal reaction zone((furnace) followed by at least one catalytic reaction zone (reactor) containing a Claus reaction catalyst and followed by a respective sulfur condenser for removing formed elemental sulfur is operated to produce a gaseous effluent stream comprising water, hydrogen sulfide, sulfur dioxide, elemental sulfur and sufficient reducing equivalents for hydrogenation of all sulfur compounds present in the gaseous effluent stream to hydrogen sulfide.

The gaseous effluent stream can contain sufficient reducing equivalents for such purposes provided that the Claus plant is operated to assure the presence of the reducing equivalents. For most Claus plants, it is expected by operating the thermal reaction zone (Claus furnace) under conditions such that only slightly less air is utilized than that required for reaction with hydrogen sulfide by reaction (1)

$$H_2S + O_2 \rightarrow H_2O + \tfrac{1}{2}S + \tfrac{1}{2}SO_2 \tag{1}$$

and by insuring that the gaseous effluent stream leaving the final sulfur condenser of the Claus plant has a low level of residual elemental sulfur, that the Claus plant gaseous effluent stream will contain sufficient reducing equivalents. By further reducing the amount of air introduced into the Claus thermal reaction zone or by other methods in the spirit of the instant invention which will be apparent to skilled persons, the amount of reducing equivalents can be further increased if necessary.

$H_2$ and CO compositions of several Claus plant gaseous  shown in the Table below. The concentrations indicate that in appropriately operated Claus plants additional $H_2$ and CO are not required for conversion of sulfur compounds into hydrogen sulfide. The Claus plant gaseous effluent streams can of course be enriched with reducing equivalents if desired.

TABLE

Claus Plant Tail Gas Compositions

| Plant | Run | Composition, Mol % | | | | | | Ratio* |
|---|---|---|---|---|---|---|---|---|
| | | $H_2$ | CO | COS | $CS_2$ | $H_2S$ | $SO_2$ | |
| 1 | 1 | 1.66 | 1.35 | 0.16 | 0.31 | 1.72 | 1.05 | 2.9 |
| | 2 | 2.00 | 1.95 | 0.15 | 0.32 | 1.26 | 0.97 | 4.1 |
| | 3 | 2.66 | 0.18 | 0.04 | 0.02 | 1.78 | 0.79 | 3.6 |
| | 4 | 1.81 | 0.28 | 0.11 | 0.39 | 1.83 | 0.98 | 2.1 |
| 2 | 1 | 1.75 | 1.20 | 0.046 | 0.045 | 0.76 | 0.47 | 6.2 |
| | 2 | 1.86 | 1.15 | 0.049 | 0.055 | 0.8 | 0.45 | 6.6 |
| | 3 | 1.96 | 1.25 | 0.028 | 0.057 | 0.88 | 0.38 | 8.6 |
| | 4 | 2.27 | 1.09 | 0.029 | 0.023 | 0.50 | 0.50 | 6.7 |
| 3 | 1 | 1.32 | 0.40 | 0.08 | 0.17 | 0.73 | 0.34 | 5.1 |
| | 2 | 1.99 | 2.17 | 0.08 | 0.25 | 1.77 | 0.02 | 208.0 |
| | 3 | 1.78 | 2.14 | 0.07 | 0.20 | 0.67 | 0.55 | 7.1 |
| 4 | 1 | 0.92 | 0.77 | 0.08 | 0.06 | 1.51 | 0.11 | 15.4 |
| | 2 | 1.46 | 1.47 | 0.00 | 0.03 | 0.65 | 0.47 | 6.2 |

*Ratio = $(H_2 + CO)/SO_2$

According to a preferred aspect of the invention, tail gas cleanup processes such as described are utilized with a three reactor Clause plant. By use of such a three reactor Claus plant, equipment sizing in both the tail gas clean up processes and in the Claus plant itself can be significantly reduced. Typical conversions obtainable with various numbers of Claus catalytic reactors are as follows for acid gas with moderately high hydrogen sulfide concentration: 2 reactors—94 to 96%; 3 reactors—96 to 98%; 4 reactors—97 to 98.5%. By utilizing three or more Claus catalytic reactors, the amount of sulfur to be removed during tail gas cleanup can be reduced as well as the amount of hydrogen required for hydrogenation of sulfur compounds to hydrogen sulfide. Thus, the tail gas cleanup unit can be sized smaller than, for example, when used with a two-reactor Claus plant. As a consequence of the tail gas cleanup unit being smaller, the amount of regeneration effluent gas to be returned to the Claus plant is reduced so that the sizing of Claus plant equipment can also be reduced. Thus, a significant reduction in equipment sizing can be achieved by utilizing a three reactor Claus plant in conjunction with the tail gas cleanup processes herein described. Claus plants having other than three Claus reactors can of cousse also be utilized.

The gaseous effluent stream from the Claus plant having sufficient reducing equivalents therein to reduce all sulfur compounds to hydrogen sulfide can be heated, for example, directly by means of direct fired heaters, or indirectly by heat exchange, for example, with other process streams such as the absorber effluent stream, to produce a heated Claus plant effluent stream having a temperature effective for removal of both hydrogen sulfide and sulfur dioxide in the presence of a solid particulate preferably high surface area (for example, pellets, extrudates, and the like), zinc oxide sorbent effective for such removal. As indicated above, this simultaneous removal of both hydrogen sulfide and sulfur dioxide is believed to proceed by hydrogenation of sulfur compounds present in the gaseous effluent stream to hydrogen sulfide in the presence of the zinc oxide, the zinc oxide in this respect acting as a catalyst, followed by absorption (by sulfiding of the zinc oxide sorbent) of the thus-formed hydrogen sulfide by the zinc oxide, the zinc oxide acting as an absorbent. Preferably, the Claus plant effluent stream can be heated to above about 1000° F. As illustrated in EXAMPLE I below, by operating at these absorber temperatures, a hydrogenation reactor is not required before absorption of hydrogen sulfide in the absorber. For this reason, it is currently preferred to operate the absorbers at about 1000° F. or greater; conversely, as discussed below, lower temperatures can be utilized with the addition of a separate distinct hydrogenation reactor or zone. When operating at temperatures above about 1000° F., materials of construction considerations can set a practical upper limit on the absorption temperature which will be used. Currently for these reasons it may be appropriate that the upper limit be about 1200° F.; however, higher temperatures can also be used, depending on the materials of construction.

Below about 1000° F., the temperature during absorption appears inadequate to provide activation energy required for a good and sufficient rate of hydrogenation of sulfur compounds in the hydrogen sulfide absorber zones in the presence of an effective hydrogen sulfide sorbent, such, for example, as by reaction (6) below. As a result, if it is preferred to operate at a temperature below about 1000° F., it is preferred to hydrogenate sulfur compounds to hydrogen sulfide in a hydrogenation zone separate and distinct from the absorber zone, prior to absorption of hydrogen sulfide in the absorber zone. With addition of a hydrogen source, if appropriate or desired, and such a hydrogenatinn zone, preferably containing a hydrogenation catalyst, such as, for example, an effective cobalt-molybdenum hydrogenation catalyst, hydrogenation can occur at temperatures from about 450° F. and higher, preferably in the range of 580° F. to about 650° F.; and hydrogen sulfide absorption in the absorbers can then be carried out at lower temperatures, for example, below about 1000° F. Absorber operation above about 1000° F. is preferred, however, because such higher temperatures favor higher sorbent absorption capacity and the hydrogenation reactor can be eliminated. Also, since absorption and regeneration are at approximately the same temperature, temperature stress on equipment can be reduced.

As indicated, for absorber operating temperatures below about 1000° F., the invention preferably comprises introducing the gaseous effluent stream into a hydrogenation zone separate and distinct from the absorber zone and hydrogenating substantially all sulfur compounds therein to hydrogen sulfide, prior to introducing the resulting hydrogen sulfide stream into the absorber zone containing the zinc oxide sorbent for absorption of the hydrogen sulfide.

Reducing equivalents for enriching the Claus plant effluent stream, if desirable or necessary, can be obtained from any convenient source and can preferably include molecular hydrogen available directly or from a donor such as carbon monoxide which can react with water in the presence of a catalyst to produce hydrogen. Hydrogen can also be economically and continuously produced for use in the process of this invention by concurrent reaction of a low cost hydrogen donor, such as methane or carbon monoxide, in a hydrogen generator, such as a steam reformer where the donor undergoes hydrogen-producing reactions such as:

$$CH_4 + H_2O \rightarrow CO + 3H_2 \quad (2)$$

$$CO + H_2O \rightarrow CO_2 + H_2 \quad (3)$$

at temperatures generally from about 1400° F. to about 1600° F. for reaction (2) and generally foom about 400° F. to about 8800° F. for reaction (3) above. The crude hydrogen output stream from the hydrogen generator can then be combined with the effluent gas stream and, as appropriate, can be used to supply part of the heat to raise the enriched effluent gas stream to the hydrogenation temperature.

Hydrogen can also be generated externally at elevated temperatures similar to those required for reaction (2) above wherein a hydrocarbon fuel such as natural gas (methane) can be reacted with oxygen as provided by air to form a supply stream generally containing hydrogen, carbon monoxide, carbon dioxide and water.

The gaseous effluent or tail gas stream containing sufficient reducing equivalents for conversion of substantially all sulfur species therein to hydrogen sulfide, whether indigenous to the stream or enriched therewith, can be introduced into a hydrogenation zone and hydrogenation of sulfur compounds allowed to proceed therein until a new equilibrium is reached. The principal reaction will be the conversion of sulfur dioxide to hydrogen sulfide as shown by Reaction (6) below; other sulfur compounds including elemental sulfur, carbonyl sulfide, carbon disulfide, and the like can also of course be reduced to hydrogen sulfide. Hydrogenatin can be carried out at a temperature of from about 450° to about 1200° F. or even higher, preferably from about 580° F. to about 650° F., depending on the conditions and the source of hydrogen chosen. Catalytic hydrogenation by contacting with a bed, either supported or fluidized, of effective hydrogenation catalyst is preferred to accelerate hydrogenation of sulfur dioxide and the other sulfur containing compounds. Useful catalysts are those containing metals of Groups VB, VIB, VIII and the Rare Earth series of the Periodic Table defined by Mendeleff, published as the "Periodic Table of the Elements" in Perry and Chilton, *Chemical Engineers Handbook*, 5th Ed. The catalysts may be supported or unsupported, although catalysts supported on a refractory inorganic oxdde, such as on a silica, alumina or silica-alumina base are preferred. The preferred catalysts are those containing one or more of the metals, cobalt, molybdenum, iron, chromium, vanadium, thorium, nickel, tungsten (W) and uranium (U) added as an oxide or sulfide of the metal, although the sulfide form appears to be the active form. Particularly preferred are cobalt-molybdenum hydrogenation catalysts such as are commercially available for use in the refining industry for desulfurization processes in the refining of oil.

According to the invention, after residual sulfur compounds are removed from gaseous effluent streams from Claus plants by first converting substantially all such sulfur compounds to hydrogen sulfide, the resulting stream now containing substantially all sulfur compounds in the form of hydrogen sulfide can then be contacted in an absorber zone with a suitable zinc oxide sorbent (either fixed or fluidized bed) by contacting the Claus plant effluent stream with the sorbent in the absorber zone to absorb hydrogen sulfide and to produce a laden (sulfided) absorbent. In a preferred embodiment wherein absorption is conducted at temperature above about 1000° F., for example, in the range of about 1000° F. to about 1200° F., the absorption of hydrogen sulfide can be accomplished in a single absorber zone simultaneously with removal of the other sulfur compounds which is believed to proceed by hydrogenating sulfur compounds present in the gaseous effluent stream to hydrogen sulfide utilizing reducing equivalents present in the gaseous effluent stream and absorbing the thus produced hydrogen sulfide on the zinc oxide sorbent to additionally produce laden sorbent.

As used herein, and in the claims, the terms "zinc-oxide sorbent", "zinc-oxide based sorbent," and "sorbent based on zinc oxide" shall mean an absorbent effective for removal of hydrognn sulfide, and/or of sulfur dioxide in the presence of reducing equivalents as described herein, in which a major portion of the active sorbent, for example, fifty percent or more, is in the form of zinc oxide. It will be appreciated that the sorbent used can also contain inactive (for absorption) materials such as binders, strengtheners, and support materials. It will further be appreciated that zinc oxide is the active form of the sorbent and that consequently any material which can be treated to produce zinc oxide can be used as a starting material so long as a sufficient amount of the sorbent is in the active zinc oxide form during absorption. Thus, for example, zinc sulfide and zinc sulfatecca be used as starting materials and treated with heat and/or oxygen to produce an active zinc oxide sorbent. Other suitable starting materials can also be used. Suitable for use in accordance with the invention are zinc oxide sorbents effective for removal of both hydrogen sulfide and sulfur dioxide (in the presence of reducing equivalents such as hydrogen) from gaseous streams containing such compounds. The zinc oxide sorbent is effective for absorbing hydrogen sulfide by undergoing sulfidization to produce a laden (sulfided) sorbent; simultaneously, if desired, hydrogenation of other sulfur compounds to hydrogen sulfide followed by such absorption can occur. During such hydrogenation, the zinc oxide sorbent appears to function both as a catalyst, in the presence of hydrogen facilitating hydrogenation of sulfur compounds present to hydrogen sulfide, and as a sorbent absorbing hydrogen sulfide present or formed. Zinc oxide sorbents are capable of high level of removal of sulfur compounds and are eelatively insensitive to the presence of Claus plant tail gas stream water, which as indicated above can range from about 20 to about 50 mol % of the Claus plant effluent stream. By eliminating the need for a water removal step in achieving a tail gas cleanup process capable of extremely high overall sulfur recovery, it will be appreciated that the invention provides a major advantage in the instance of new plants, but of course, the invention can also be utilized in conjunction with existing plants which do have a water removal step because of advantages which can be realized by eliminating chemical (amine) absorption or oxidation steps with their concomitant high energy costs for regeneration compared to absorption.

The zinc oxide sorbents are preferably high surface area solids as described above and suitable binder, support, and strengthening materials can be utilized to increase the sorbent surface area and physical strength to increase sorbent capacity and sorbent life.

Particularly preferred are those zinc oxide sorbents which are thermally stable, regenerable, and capable of absorbing substantial amounts of sulfur compounds. An acceptable sorbent for use in accordance with the invention is United Catalysts, Inc., G72D Sulfur Removal Catalyst, available from United Catalysts, Inc., Louisville, KY, having the following chemical composition and physical properties:

| CHEMICAL COMPOSITION | | | |
|---|---|---|---|
| | wt % | Trace Metal Impurities | wt % |
| ZnO | 90.0 ± 5% | Pb | <0.15 |
| Carbon | <0.20 | Sn | <0.005 |
| Sulfur | <0.15 | As | <0.005 |
| Chlorides | <0.02 | Hg | <0.005 |
| $Al_2O_3$ | 3–7 | Fe | <0.1 |
| CaO | 0.5–3.0 | Cd | <0.005 |

| PHYSICAL PROPERTIES | |
|---|---|
| Form | Pellets |
| Size | 3/16 in. |
| Bulk Density | 65 ± 5 lbs/ft3 |
| Surface Area | 35 m2/g minimum |
| Pore Volume | 0.25–0.35 cc/g |
| Crush Strength | 15 lbs minimum average |

Representative chemical reactions believed to occur during hydrogen sulfide absorption and regeneration of such zinc oxide sorbents are shown below:

During Absorption:

$$H_2S + ZnO \rightarrow ZnS + H_2O \qquad (3)$$

$$COS + ZnO \rightarrow ZnS + CO_2 \qquad (4)$$

$$CS_2 + 2ZnO \rightarrow 2ZnS + CO_2 \qquad (5)$$

$$SO_2 + 3H_2 \rightarrow H_2S + 2H_2O \qquad (6)$$

$$H_2S + \text{Sulfated Sorbent} \rightarrow SO_2 + \text{Zinc Oxide Sorbent} \qquad (7)$$

during absorption, $H_2S$, COS (carbonyl sulfide), and $CS_2$ (carbon disulfide) in the stream can react respectively with the zinc oxide sorbent to form zinc sulfide as shown in Eqs. (3) to (5). Eq. (6) shows that $SO_2$ can react directly with $H_2$ to form $H_2S$ as discussed herein in more detail, and the resulting $H_2S$ can then be removed by the zinc oxide sorbent by Reaction (3). Carbonyl sulfide an carbon disulfide may also be hydrogenated to hydrogen sulfide before absorption as described herein. Under certain conditions, for example, when the catalyst comprises calcium or other elements capable of sulfation under the process conditions, the sorbent may become sulfated and $SO_2$ may be produced during absorption according to the reaction shown in Eq. (7).

During Regeneration:

$$ZnS + 3/2\, O_2 \rightarrow ZnO + SO_2 \qquad (8)$$

$$\text{Sorbent} + SO_2 + O_2 \rightarrow \text{Sulfated Sorbent} \qquad (9)$$

After the sorbent is sulfided, regeneration can be accomplished by oxidizing the zinc sulfide to zinc oxide as shown by Eq. (8). Sorbent sulfation can also occur, as shown by Eq. (9), at sufficiently high regeneration temperatures in the presence of oxygen and sulfur dioxide. Temperature rise during regeneration because of the highly exothermic nature of regeneration can thus suffice under certain conditions to destroy both the physical integrity and the chemical activity of the sorbent. Consequently, temperature rise during regeneration is preferably controlled.

In the embodiment of the invention wherein removal of sulfur dioxide and other sulfur compounds by hydrogenation of such sulfur compounds present in the gaseous effluent stream can proceed simultaneously with absorption in the absorber zone, absorption is preferably conducted at temperatures effective for absorbing hydrogen sulfide on the absorbent and for removing both hydrogen sulfide and sulfur dioxide and other sulfur compounds from the gaseous effluent stream. The temperature is preferably above about 1000 ° F. as previously discussed. In the embodiment of the invention wherein hydrogenation occurs in a separate distinct hydrogenation zone prior to absorption, the absorber zone can be oeerated at lower temperatures effective for absorption of hydrogen sulfide, preferably in the range of about 600 ° F. to about 1000 ° F.

In either embodiment, the absorber zone can comprise at least a first absorber zone (reactor) and a second absorber zone (reactor) and the process can comprise contacting hydrogen sulfide with a sorbent in the first absorber zone to absorb hydrogen sulfide and to produce a laden sorbent and to produce a first absorber effluent stream lan in hydrogen sulfide; continuing such sorption for a period of time less than that required for hydrogen sulfide breakthrough; and thereafter contacting the hydrogen sulfide with a sorbent in the second absorber zone to absorb hydrogen sulfide and to produce a laden sorbent and to produce a second absorber effluent stream lean in hydrogen sulfide; and simultaneously regenerating the laden sorbent in the first absorber zone by introducing a regeneration stream comprising an oxygen- containing gas thereinto at a temperature effective to convert the laden (sulfided) sorbent to active sorbent and to produce a regenerator effluent stream comprising sulfur dioxide.

Absorption can be continued until preferably just before $H_2S$ breakthrough occurs. For practical purposes, $H_2S$ breakthrough can be defined as occurring when the $H_2S$ concentration in the absorber effluent stream reaches a preset low value, such as for example, 20 ppm $H_2S$. As shown in EXAMPLE II below, breakthrough time and absorption capacity increase with increasing absorber temperature.

As indicated, following breakthrough for a respective absorption reactor, the feedstream to the absorption reactor can be switched to another absorber zone or reactor and the sulfided sorbent can be regenerated by passing a heated dilute oxygen containing gas regeneration stream in contact with the sulfided sorbent. The sulfided sorbent can thereby be converted back to the active form, for example, zinc sulfide can be converted back to zinc oxide as the sulfur leaves the absorber on regeneration as elemental sulfur, or more preferably as $SO_2$, in the regeneration stream. Due to the exothermic nature of the regeneration reaction, suitable methods for diluting the oxygen can be used. Suitable methods can include the following: (1) a portion of the regenerator effluent gas can be recycled around the absorber undergoing regeneration to reduce the oxygen concentration in the oxygen-containing regeneration stream down to, for example, less than 10 mol %, (2) the absorber effluent gas from the absorber on absorption can be split and a portion of the absorber effluent gas can be blended with the oxygen-containing regeneration stream before entering the absorber undergoing regeneration.

Regeneration can be continued until substantially all of the sulfided sorbent is regenerated, for example, until zinc sulfide is substantially reconverted to zinc oxide. Completion of regeneration can be conveniently determined by monitoring sulfur dioxide content or temperature of the regenerator effluent stream.

Factors which can affect the time required for regeneration include: (1) the amount and extent of laden (sulfided) sorbent (i.e., ZnS); (2) the concentration of oxygen in the regeneration stream; (3) the flow rate of the regeneration stream; (4) the regeneration temperature; and (5) the method by which zinc sulfide is converted back to zinc oxide.

Oxygen concentration and flow rate can be determined so that the time required for regeneration and cooling, if necessary, is equivalent to absorption time. Since the regeneration stream flow rate can be shown to be inversely proportional to the oxygen concentration therein and since the $SO_2$ produced during regeneration can be returned in accordance with the invention, for example, to the furnace of the Claus plant, it is preferred to utilize higher oxygen concentrations to minimize the size of the Claus plant required. However, the temperature rise due to Reaction (8) discussed above during regeneration limits the maximum allowable oxygen concentration which can be used to prevent damage to the sorbent and to minimize corrosion problems. Based on these considerations, it is thought that the oxygen concentration should be maintained in the range of about 5 mmol % to about 10 mol % and that the temperature during regeneration should be maintained in an effective range for regeneration, preferably in the range of about 800° F. to about 1800 ° F., most preferably about 1100 ° F. to about 1500 ° F.

As will be appreciated by those skilled in the art from the foregoing discussion, materials of construction for the valves, vessels, and piping for the process according to the invention can require special attention. The material preferably has the capability of withstanding high temperatures, for example, in the range of about 800° F. to about 1500 ° F. or higher while being repeatedly exposed to reducing and oxidizing atmospheres in the presence of sulfur compounds. Steel alloys having an austenitic structure with a high chromium:nickel ratio, for example, of at least two or higher, are thought to be satisfactory materials of construction, as well as refractory-lined carbon steel.

For reasons which will be apparent hereinafter, regeneration can be accomplished by introducing the regeneration stream containing the oxygen-containing gas into the first absorber zone at a temperature in the range of, for example, above about 1100 ° F. until a first plateau of sulfur dioxide of about 200 ppm in the first absorber effluent stream is achieved and thereafter reducing the temperature to below about 800 ° F. during completion of regeneration. This method of regeneration may be preferred in the case where hydrogenation occurs in a hydrogenation zone prior to absorption because the reduction in temperature to below about 800° F. can comprise a portion of the cooling cycle for cooling the sorbent of the absorber undergoing regeneration for subsequent contacting with hydrogen sulfide for absorption.

Following regeneration, the regenerated sorbent is ready for use during the absorption cycle as described above.

The invention will be further understood by the EXAMPLES which are set forth below.

EXAMPLE I—ABSORPTION: EFFECT OF TEMPERATURE

The effect of temperature on hydrogen sulfide breakthrough is studied using a laboratory catalyst holder/reactor made from type 304 stainless steel tubing 2" (inch) diameter (O.D.)×0.068" thick wall, 27" long overall. Calculated catalyst volume for 18" depth is 805 ml (milliliters), and the catalyst is supported by a 20 mesh stainless steel screen. Catalyst used is G72D Sulfur Removal Catalyst described above. The reactor is wrapped by six heaters (22 gauge nichrome wire) for preventing radial heat loss, and is insulated with fibergass. The total flow rate for absorption is 10 l./min (liters/min) and for regeneration 5 l./min. The reactor is placed in a large Blue M ® oven, available from Blue M Electric Compayy, Blue Island, IL. All gas flow through the catalyst bed is downflow. Provisions for side draw of aas samples are available near the reactor axis each 1.5" of catalyst depth.

The effect of reaction temperatures on $H_2S$ breakthrough time during absorption is illustrated by introducing a feed gas having the following composition into the reactor inlet:

| | |
|---|---|
| $H_2S$ | 0.8 mol % |
| $SO_2$ | 0.4 mol % |
| CO | 1.0 mol % |
| $H_2O$ | 30.0 mol % |
| $N_2$ | 45.8 mol % |
| $H_2$ | 2.0 mol % |
| $CO_2$ | 20.0 mol % | he feed gas is introduced at 850 ° F., at 1000 ° F., and at 1150 ° F. Breakthrough, defined for purposes of these runs as 50 ppm $H_2S$ in the absorber effluent, and $H_2S$ concentration in the effluent gas at equilibrium, are determined. Results are set forth in the following Table IA.

TABLE IA

| | | Combined $SO_2$ and $H_2S$ Concentration Absorption Capacity | | | |
|---|---|---|---|---|---|
| Run | Temp. | Time (Hrs) for Breakthrough | (Dry Basis) at Equilibrium | wt % | mols absorbed/ mols sorbent |
| 1 | 850° F. | (Immed. $SO_2$ Breakthrough) | — | — | — |
| 2 | 1000° F. | 25.5 hrs | 10 ppm | 33% | 0.84 |
| 3 | 1150° F. | 27.5 hrs | 20 ppm | 36% | 0.92 |

The results indicate that higher temperatures favor increased absorption capacity as indicated by increased breakthrough times and that lower temperatures favor lower equilibrium concentration of $H_2S$ in the absorber effluent streams. It is also noted that at 1000 ° F. and at 1150 ° F., $SO_2$ present in the inlet stream is substantially completely absorbed; while at 850° F., $SO_2$ appears immediately in the absorber effluent stream. Thus at temperatures at least about 1000 ° F. and higher hydrogenation of $SO_2$ to $H_2S$ is not required prior to absorption.

EXAMPLE II—ABSORPTION: EFFECT OF TEMPERATURE

The effect of temperature on hydrogen sulfide breakthrough is further investigated by the following runs using the apparatus described in EXAMPLE I and using an inlet stream having the following composition:

| | |
|---|---|
| $H_2S$ | 1.2 mol % |
| $H_2O$ | 29.5 mol % |
| H | 1.06 mol % |
| CO | 1.01 mol % |
| $CO_2$ | 20.39 mol % |
| $N_2$ | 46.83 mol % |

This inlet stream can be used to simulate the condition where $SO_2$ present in a Claus plant effluent stream is hydrogenated to $H_2S$ prior to absorption. Breakthrough time for various temperatures below 850° F. are determined and are shown in Table IIA below:

TABLE IIA

| Run | Temp. | Time (Hrs) for Breakthrough | wt % | Absorption Capacity mols/mol sorbent |
|---|---|---|---|---|
| 4 | 625° F. | 3 | 4% | 0.10 |
| 5 | 700° F. | 11 | 14% | 0.36 |
| 6 | 775° F. | 17 | 22% | 0.46 |

These results further confirm the dependence of absorption capacity and breakthrough on absorption temperature.

EXAMPLE III—ABSORPTION: EFFECT OF WATER

The effect of the presence of water on sulfur compound breakthrough is illustrated in part by EXAMPLE I above in which a feed gas stream containing 30.0% water is contacted with a zinc oxide sorbent and, at 1000° F. or higher, the sulfur compounds in the effluent stream are reduced to 20 ppm or lower.

To further investigate the effect of water on sulfur compound breakthrough using a metal oxide sorbent, the apparatus of EXAMPLE I can be used with a zinc ferrite sorbent containing about 45% iron oxide and about 55% amorphous silica. About 15% of the 45% iron oxide is in the form of zinc ferrite. A feed gas having the following composition is introduced into the reactor inlet at 1000° F.:

| | |
|---|---|
| $H_2S$ | 1.2% |
| CO | 1% |
| $H_2$ | 2% |
| $CO_2$[1] | 20% (42%) |
| $H_2O$[1] | 22% (0%) |
| $N_2$ | 53.8% |

[1]$CO_2$ content of inlet stream is increased from 20% to 42% when 22% $H_2O$ is eliminated from the feedstream.

After about 5½ hours, water is eliminated from the feedstream. The results are shown in Table IIIA below.

TABLE IIIA

| Time (Hrs) | $H_2S$ Concentation in Reactor Effluent |
|---|---|
| 1 | 663 |

TABLE IIIA-continued

| Time (Hrs) | H₂S Concentration in Reactor Effluent |
|---|---|
| 2.3 | 733 |
| 3.4 | 818 |
| 4.1 | 994 |
| 5.5[1] | 1682 |
| 5.7 | 9 |
| 7.1 | 9 |
| 8.6 | 9 |

[1]Water eliminated from feedstream.

The results indicate that the iron oxide (zinc ferrite) sorbent is sensitive to the presence of water in the feedstream as compared with the zinc oxide of EXAMPLE I. After water is removed from the feedstream, hydrogen sulfide in the effluent stream is reduced to 9 ppm. These results indicate that zinc oxide is less sensitive to water than is iron oxide (zinc ferrite).

EXAMPLE IV—REGENERATION

Regeneration is investigated using the apparatus described in EXAMPLE I by passing a dilute air stream in contact with the sulfided sorbent. The effect of temperature on regeneration is investigated. For a dilute air regeneration stream containing about 5 mol % oxygen having an inlet temperature of about 1000 °F., the sulfur recovered as $SO_2$ in the regeneration effluent stream is only 0.75 mol %. However, when the inlet temperature is raised to 1150 °F. after 5½ hrs, about 3 mol % of sulfur as $SO_2$ appears in the regeneration effluent stream. This higher regeneration temperature is considered preferred to overcome the high activation energy required for Reaction (8) above. During regeneration, the concentration of $SO_2$ in the regeneration effluent stream remains above about 3.5 mol % and the concentration of $O_2$ in the regeneration effluent stream remains about 0 mol %, indicating substantially complete consumption of $O_2$, for about 22 hrs. After about 22 hrs, when regeneration is about complete, $O_2$ starts to breakthrough and $SO_2$ content begins to decline in the regeneration effluent stream.

EXAMPLE V—REGENERATION

Regeneration is investigated using the method described in EXAMPLE IV. During regeneration, for the first 20 hrs, the $SO_2$ concentration is at the relatively high level of 3.5 mol % for about 5 mol % in the regeneration stream. It drops rapidly to a first intermediate plateau of about 150 ppm $SO_2$ and then gradually to a low level of 50–100 ppm from 21–23 hrs. If the inlet temperature is reduced from about 1150° F. to about 800° F. when the $SO_2$ is at the first intermediate plateau of about 150 ppm $SO_2$, the $SO_2$ concentration in the regeneration effluent stream reduces from 150 ppm to 20 ppm very rapidly. Accordingly, regeneration can be ended if desired as soon as $SO_2$ in the regeneration effluent stream is reduced to less than the first intermediate plateau, for example, less than about 200 ppm or that the regenerated reactor be cooled to about 800° F. for the duration of regeneration and this lower temperature be used for absorption, with as also indicated above, a hydrogenation reactor requirement.

EXAMPLE VI—EFFECT OF HYDROGEN

The effect of the presence or absence of hydrogen is investigated using the apparatus described in EXAMPLE I above. Inlet stream composition and temperature are set forth in Table VI-A; results are set forth in Table VI-B. The runs are made at about 1200° F.

TABLE VI-A

INLET STREAM COMPOSITION AND TEMPERATURE

| Run | $SO_2$[3] | $H_2S$[3] | $H_2$ | Combined CO, $CO_2$, $H_2O$, $N_2$ |
|---|---|---|---|---|
| 7 | 0.4% | 0.8% | 1.5% | 97.3% |
| 8[1] | 0.4% | 0.8% | 0% | 98.8% |
| 9 | 0.4% | 0% | 1.5% | 98.1% |
| 10[2] | 0.4% | 0% | 0% | 99.6% |

[1]Run 8 is initiated by discontinuing flow of hydrogen in Run 7.
[2]Run 10 is initiated by discontinuing flow of hydrogen in Run 9.
[3]Based on analysis of wet gas.

TABLE VIB

| Run | Time (Hrs) | $SO_2$ in Effluent[2] | $H_2S$ in Effluent[2] |
|---|---|---|---|
| 7 | 1.1 | 150 ppm | 20 ppm |
|  | 1.9 | 150 ppm | 20 ppm |
| 8[1] | 0 | 150 ppm | 20 ppm |
|  | 0.5 | 0.31 mol % | 0 ppm |
|  | 1.3 | 0.5 mol % | 0 ppm |
| 9 | 0 | 0.5 mol % | 0 ppm |
|  | 0.6 | 300 ppm | 20 ppm |
|  | 0.8 | 150 ppm | 20 ppm |
|  | 1.3 | 100 ppm | 20 ppm |
| 10 | 0 | 100 ppm | 20 ppm |
|  | 0.25 | 800 ppm | 0 ppm |
|  | 1.25 | 0.6 mol % | 0 ppm |
|  | 2.1 | 0.6 mol % | 0 ppm |

[1]Time measured from time flow of hydrogen is discontinued.
[2]Based on analysis of dry gas.

Run 7 indicates that both sulfur dioxide and hydrogen sulfide are effectively removed in the presence of hydrogen. Run 8 indicates, after hydrogen flow is discontinued, that hydrogen sulfide removal continues but that removal of sulfur dioxide decreases. Run 9 indicates, in the presence of sulfur dioxide and effective hydrogen, but in the absence of hydrogen sulfide, that the sorbent is effective for sulfur dioxide removal. Run 10 indicates that, after hydrogen flow is discontinued, removal of sulfur dioxide quickly diminishes.

The invention will be further described and further advantages and applications and equivalents will be apparent to those skilled in the art from the description of the drawings.

Figure 1:
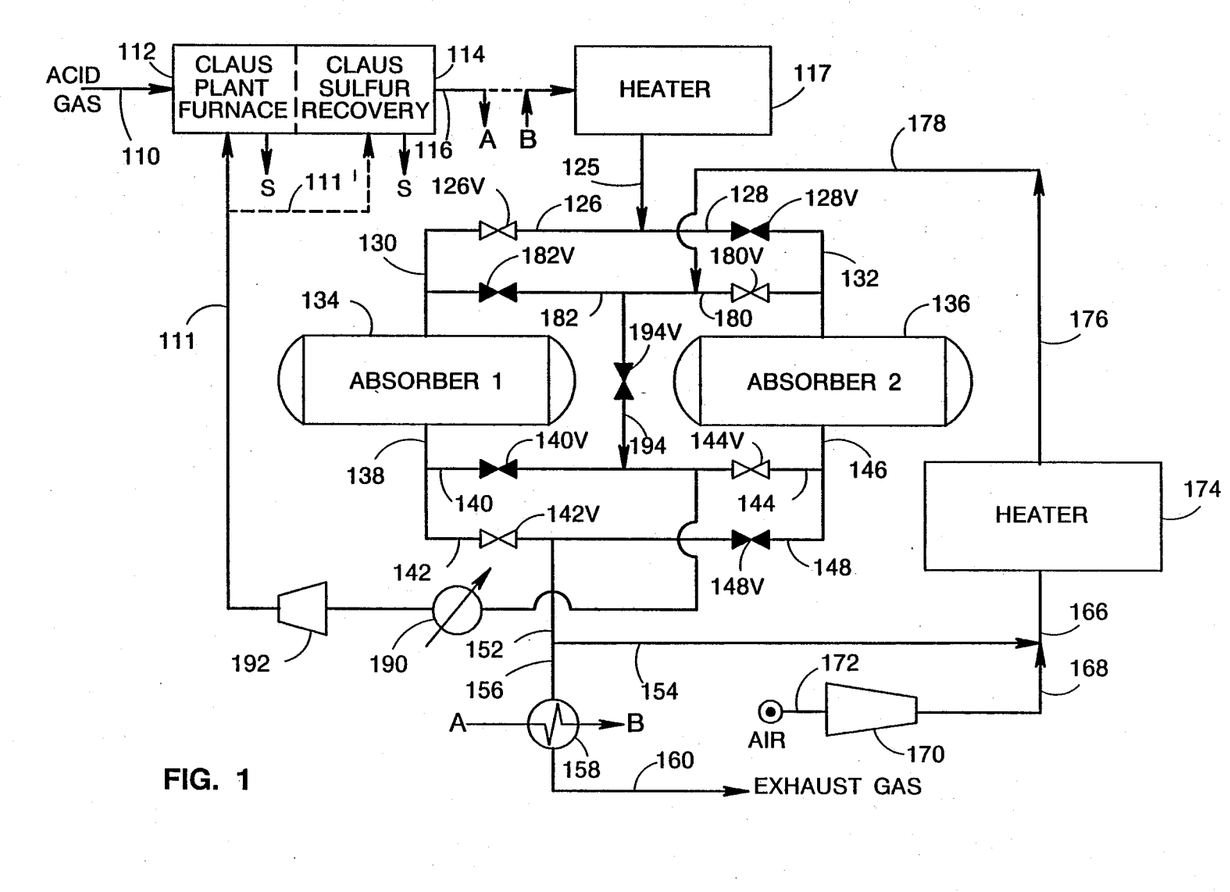
FIG. 1 shows schematically a first embodiment of the invented process.

Referring now to the drawings and specifically to FIG. 1, FIG. 1 represents an embodiment of the invented process in which absorption of hydrogen sulfide or the metal oxide sorbent can be carried out at a temperature above about 1000° F., preferably in the range of about 1000° F. to about 1200° F.

An acid gas srream 110 containing $H_2S$ is introduced into a Claus plant furnace 112 and combusted, in the presence of oxygen containing gas, for example, atmospheric air, and/or $SO_2$ (provided, for example, via line 111), to produce elemental sulfur, $SO_2$, and water. The elemental sulfur is recovered and unconverted $H_2S$ and $SO_2$ are processed by Claus sulfur recovery 114 to produce additional elemental sulfur removed, for example, by sulfur condensers (shown schematically by the arrow S) and a Claus plant effluent stream in line 116 containing sufficient reducing equivalents for reduction of sulfur containing compounds remaining therein to $H_2S$ in the hydrogenation zone or in the absorber zone.

The Claus plant fffluent stream in line 116 can then be heated to an effective temperature as described herein. Preferably at least a portion of the heating requirements can be met by passing the Claus plant eflluent stream 116 in direct heat exchange with the absorber effluent stream in line 156, for example, in recuperator 158, as indicated schematically by the line marked A. Following heating in recuperator 158, the heated Claus plant effluent stream can be provided by the lines marked B to heater 117 for further heating to above 1000° F., preferably in the range of about 1000°–1200° F. Alternatively, of course, the Claus plant effluent stream 116 can be provided directly (as indicated by the dashed line) and can be heated in heater 117 to a temperature in the range of about 1000° F. to about 1200° F. and introduced by lines 125, 126, valve 126V, and line 130 into first absorber 134. That other provision can be made for heating the Claus plant effluent stream in accordance with the invention will be clear to those skilled in this art.

First absorber 134 contains a zinc oxide sorbent effective to absorb $H_2S$ present in the inlet stream to produce a sulfided sorbent and to produce an absorber effluent stream 138 containing, for example, less than about 20 ppm $H_2S$. Simultaneously with absorption in first absorber 134, after heating to a temperature in the range of 1000° F. to 1200° F., $SO_2$ present in Claus effluent stream 116 can be hydrogenated to $H_2S$ utilizing reducing equivalents present in Claus effluent stream 116 and the resulting $H_2S$ can also be absorbed by the sorbent.

The absorber effluent stream 138 can be conducted by lines 142, valve 142V, lines 152, 156, heat recuperator 158 (for example, for producing high pressure steam), and line 160 for discharge, for example, to the atmosphere. The heat recuperator 158 also can be utilized to provide at least a portion of the heat required for heating the Claus plant effluent stream as described above. A portion of the absorber effluent stream can be withdrawn from line 152, by way of, for example, line 154, for dilution of atmospheric air 172, via compressor 170 and line 168, to produce a dilute air regeneration stream 166.

The regeneration stream 166 can be heated in heater 174 to regeneration temperatures and can be conducted by lines 176, 178, 180, valve 180V, and line 132 to second absorber 136 shown on regeneration. The heated regeneration stream 176 is thus passed in contact with sulfided sorbent in second absorber 136 to produce a regeneration effluent stream 146 having a reduced $O_2$ content and an increased $SO_2$ and/or sulfur content. Stream 146 is conducted by line 144, valve 144V, heat recuperator 190, compressor 192, and line 111 to the Claus plant furnace 112. Alternatively, the regeneration effluent stream can be introduced into a catalytic zone in the Claus plant 114 as indicated by dotted line 111'; however, operation should insure that no free or molecular oxygen is introduced thereby into the catalytic zone.

Absorption is continued in first absorber 134 and regeneration is continued in second absorber 136 until prior to or just before $H_2S$ breakthrough occurs in effluent stream 138 from first absorber 134. Preferably, the oxygen content and regeneration stream flow rate is established so that the regeneration time is about equal to absorption time prior to $H_2S$ breakthrough. $H_2S$ breakthrough can be determined by monitoring the $H_2S$ content of first absorber effluent stream 138 until $H_2S$ content can exceed a predetermined limit which can be, for example, that suitable to meet emission requirements for discharge of stream 160.

Following $H_2S$ breakthrough, first absorber 134 can be placed on regeneration and second absorber 136 can be placed on absorption by closing valves 126V, 142V, 180V, and 144V in their respective lines 126, 142, 180, and 144; and by opening valves 128V, 182V, 140V, and 148V in the respective lines 128, 182, 140, and 148. Valve 194V in line 194 (which can be closed during normal operation) can be utilized to minimize pressure shock during valve switching.

Figure 2:
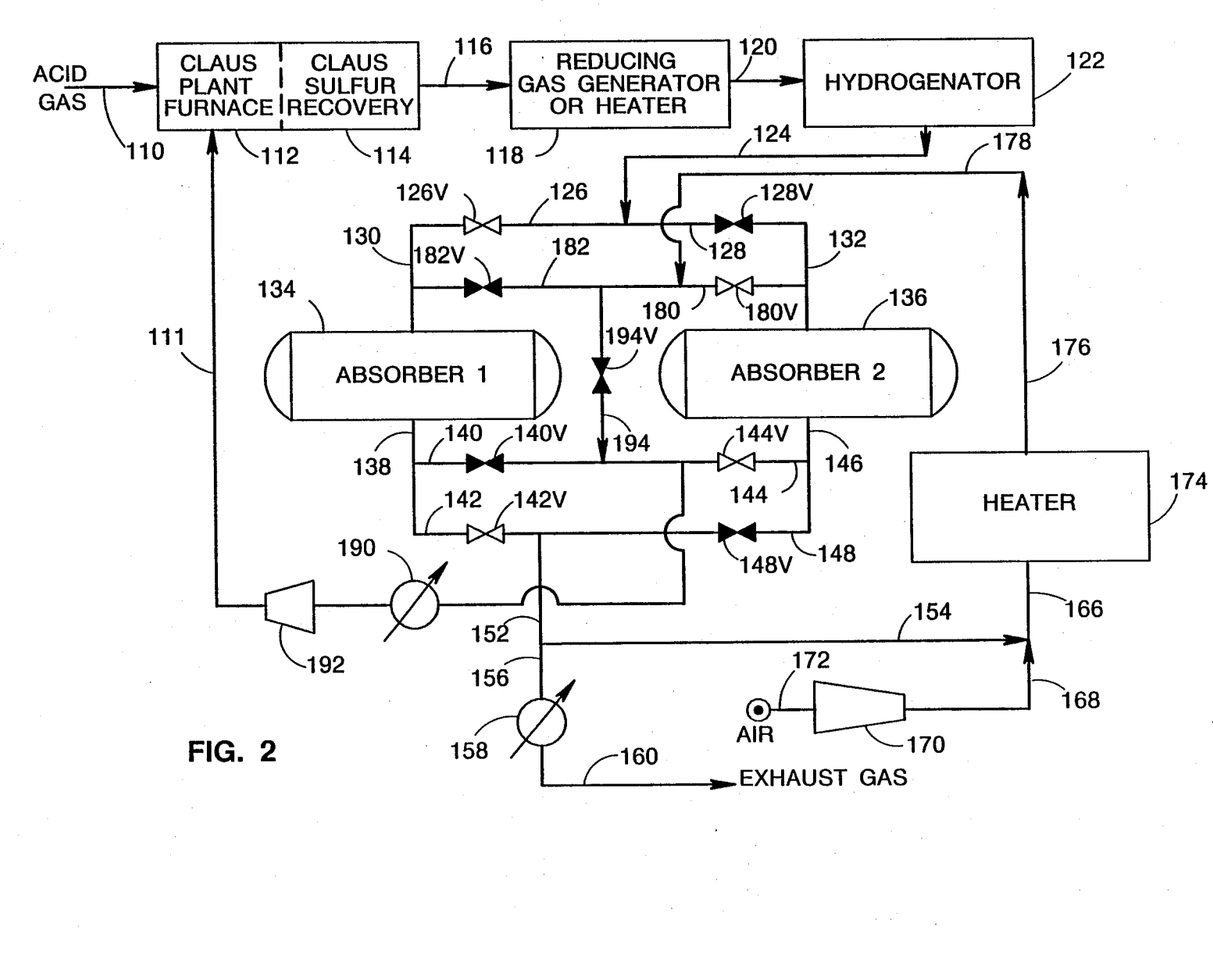
FIG. 2 shows schematically a second embodiment of the invented process.

Referring now to FIG. 2, FIG. 2 represents a second embodiment of the invention in which absorption can preferably be conducted, for example, in the range of about 600° F. to about 1000° F. and having a hydrogenation zone prior to hydrogen sulfide absorption. The reference numerals for FIG. 2 are the same as for FIG. 1 except as may be indicated below.

Claus plant effluent stream 116 can be heated in reducing gas generator or heater 118 and optionally reducing equivalents can be added to produce stream 120. Stream 116 can also be at least partially heated in indirect heat exchange with absorber effluent stream 156 in recuperator 158 as discussed above in reference to FIG. 1. Stream 120 can be conducted to hydrogenator 122, in which $SO_2$ (and other sulfur compounds such as elemental sulfur, carbonyl sulfide and carbon disulfide) present in the Claus effluent stream 116 can be hydrogenated to $H_2S$ over an effective hydrogenation catalyst, preferably, for example, a cobalt-molybdenum hydrogenation catalyst. The hydrogenated stream 124 can then be introduced, for example, into first absorber 134 and $H_2S$ contained therein absorbed.

During regeneration of, for example, second absorber 136, regeneration can be conducted as described above in reference to FIG. 1. Alternatively, regeneration can be conducted at an initial high temperature, for example, about 1150° F., until $SO_2$ in regeneration effluent stream 146 drops from regeneration equilibrium conditions, for example, about 3 mol % $SO_2$ when 4.5 mol % oxygen is used for regeneration, to a first intermediate plateau, for example, about 200 ppm $SO_2$, and thereafter reducing regeneration temperature to the temperature required for absorption, for example, about 600° F. to about 1000° F., for the remainder of the regeneration period.

Other aspects of FIG. 2 and the operation thereof have been described above with reference to FIG. 1 and will not be repeated here.

Figure 3:
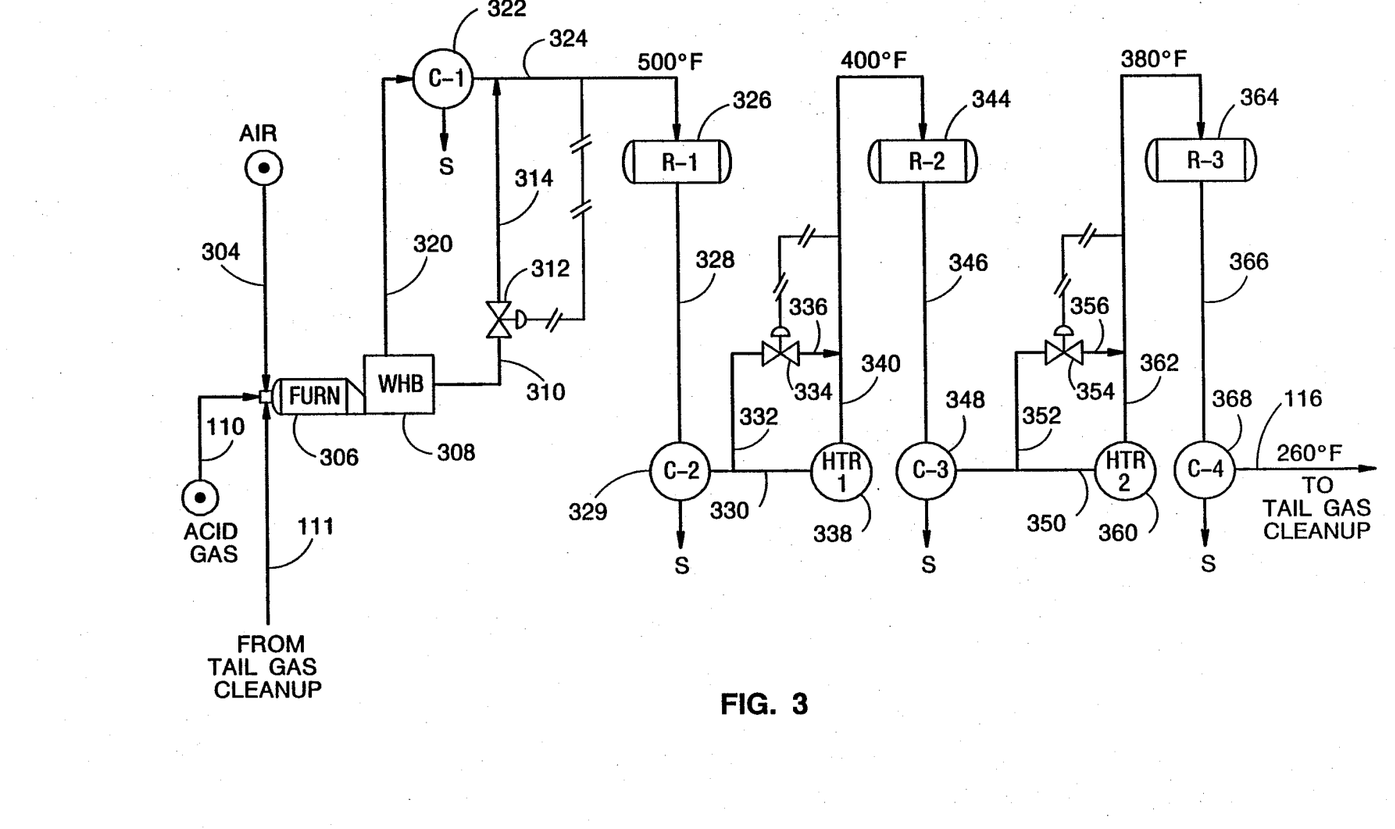
FIG. 3 shows schematically a three reactor Claus plant.

Referring now to FIG. 3, FIG. 3 illustrates schematically a three-reactor Claus plant preferably used in accordance with the instant invention. Acid gas can be introduced into Claus furnace 306 by line 110; an oxygen-containing gas, for example, air can be introduced by line 304; and a regeneration effluent stream containing sulfur dioxide and/or elemental sulfur can be introduced by line 111. In furnace 306, the acid gas, air, and sulfur dioxide are combusted at a temperature above about 1000° F., preferably about 2000° F. to achieve a stable flame, and a hot products effluent stream comprising elemental sulfur, sulfur dioxide, and unreacted hydrogen sulfide is produced. Sufficient air can be used to produce about a 2:1 molar ratio of hydrogen sulfide:sulfur dioxide in the hot reaction products effluent stream. The hot products effluent stream can flow to a waste heat boiler by line 308 shown in flow communication with furnace 306 for cooling. The cooled effluent products stream can be withdrawn from waste heat boiler by line 320, introduced into first condenser 322 and cooled, for example, to below about 400° F. to condense elemental sulfur which is removed. A portion of the cooled effluent products can also be removed from waste heatbboiler 308 by line 310, valve 312, and line 314 and used for reheating the first condenser 322 effluent in line 324 prior to entry into the Claus ctalytic conversion zone. Other methods of reheat can, of course, also be used.

The Claus catalytic conversion zone illustrated in FIG. 3 uses three Claus catalytic reactors 326, 344, and 364. Each of the catalytic reactors is provided with catalyst, for example, in a supported bed through which the process stream flows and by which the Claus reaction is facilitated. Any of the known Claus catalysts can be used. Each of reactors 326, 344, and 364 are operated above the sulfur condensation temperature at a bed temperature in the range of about 350° F. to about 700° F., preferably about 350° F. to about 550° F.

Thus, an inlet stream is provided by line 324 at about 500° F. to first Claus reactor 326. In first Claus reactor 326, hydrogen sulfide and sulfur dioxide react in the presence of the Claus catalyst and produce a first reactor effluent stream, which can be removed by line 328, containing elemental sulfur, hydrogen sulfide, and sulfur dioxide.

The first reactor effluent can be introduced by line 328 into second condenser 329 in which the gas can be cooled, for example, to below about 320° F. and elemental sulfur removed. The condenser effluent stream can be removed by line 330, and heated by first heater 338, or bypassed around heater 338 by line 332, valve 334, and line 336, to produce in line 340 a heated condenser effluent stream at a suitable temperature for Claus reaction, for example, about 400° F.

The stream in line 340 can be passed through second Claus reactor 344 where the Claus reaction is facilitated and an effluent stream containing elemental sulfur, hydrogen sulfide and sulfur dioxide can be removed by line 346.

The effluent stream in line 346 can be introduced into third condenser 348, cooled to below the sulfur condensation temperature and elemental sulfur removed to produce a third condenser effluent stream which can be removed by line 350.

The condenser effluent stream in line 350 can be heated by second heater 360, or bypassed around second heater by line 352, valve 354, and line 356 to produce in line 362 a heated condenser effluent stream at a suitable temperature for Claus conversion, for example, about 380° F.

The stream in line 362 can be introduced at about 380° F. and passed through third Claus reactor 364 where the Claus reaction is facilitated and an effluent stream containing elemental sulfur, hydrogen sulfide, and sulfur dioxide can be removed by line 366.

The effluent stream in line 366 can then be introduced into fourth condenser 368, cooled to below the sulfur condensation temperature and elemental sulfur removed to produce a fourth condenser effluent stream at, for example, 260° F., which can be removed by line 116 to a tail gas cleanup process in accordance with the invention.

It will be appreciated by those skilled in the sulfur recovery art that a Claus plant tail gas cleanup process is provided which is not sensitive to water content in the effluent stream and which is capable of recoveries to below 20 ppm H₂S in the exhaust stream. Other embodiments and applications in the spirit of the invention and within the scope of the appended claims will be apparent to those skilled in the art from the description herein.

What is claimed is:

1. In an Apparatus for the recovery of sulfur comprising

Claus conversion means for converting hydrogen sulfide to sulfur and for producing an effluent stream comprising hydrogen sulfide, sulfur dioxide, and means for providing in the effluent stream reducing species in at least the stoichiometric amount required for converting 111 sulfur species in the effluent stream to hydrogen sulfide, hydrogenation means in flow communication with the Claus conversion means for receiving the effluent stream therefrom and for converting substantially all sulfur compounds therein and for producing a hydrogenerated effluent stream containing substantially all sulfur compounds as hydrogen sulfide, the hydrogenation means containing a bed of effective hydrogenation catalyst having at least one metal selected from the group consisting of Groups VB, VIB, and VIII, and the Rare Earth Series of the Periodic Table of the Elements, and mixtures of any two or more thereof, in contact with which the effluent stream is passed for conversion of substantially all sulfur compounds to hydrogen sulfide, absorber means in flow communication with the hydrogenation means for receiving the thus hydrogenated effluent stream therefrom and for removing hydrogen sulfide therefrom in the presence of a zinc oxide sorbent and for producing an absorber effluent stream reduced in content of hydrogen sulfide, the absorber means comprising at least a first reactor and a second reactor, each of the first reactor and the second reactor containing the zinc oxide sorbent, and the apparatus further comprising regeneration means fo producing a heated regneration stream effective for regeneration of the zinc oxide sorbent and for introducing oxygen-containing gas into a reactor during regnration, switching means for placing the first reactor on sorption and the second reactor on regneration and for placing the second reactor on sorption and the first reactor on regneration, absorber effluent gas being produced from the reactor on sorption and regeneration effluent gas being produced from the reactor on regneration, the improvement comprising:

means for connecting the reactor on sorption in flow communication with the reactor on regeneration and for providing abosrber effluent gas to the reactor on regeneration.

2. Apparatus as in claim 1 wherein:

the Claus conversion means comprises a Claus furnace for thermally converting hydrogen sulfide in the presence of oxygen and for producing a furnace effluent stream containing sulfur, hydrogen sulfide, sulfur dioxide, and said reducing species; and the Claus conversion means further comprises at least one Claus catalytic reactor for receiving the furnace effluent stream and for converting hydrogen sulfide and sulfur dioxide in the furnace effluent stream to sulfur and condenser means for removing elemental sulfur therefrom and for producing the effluent stream provided to the heating means.

3. Apparatus as in claim 2 wherein:

the Claus converstion means comprises a Claus plant having at least three Claus catalytic reactors having associated condenser means.

4. Apparatus as in claim 2 further comprising:
flow means in flow communication with the reactor on regeneration for receiving regeneration effluent gas and for returning the regeneration effluent gas to the Claus conversion means.

5. In an Apparatus for the recovery of sulfur comprising
Claus conversion means for converting hydrogen sulfide to sulfur and for producing an effluent stream comprising hydrogen sulfide, sulfur dioxide, and means for providing in the effluent stream reducing species in at least the stoichiometric amount required for converting all sulfur species in the effluent stream to hydrogen sulfide, the improvement comprising:
absorber means in flow communication with the Claus conversion means for receiving the effluent stream therefrom and for removing both hydrogen sulfide and sulfur dioxide therefrom in the presence of zinc oxide sorbent and in the essential presence of reducing species and for producing an absorer effluent stream reduced in content of hydrogen sulfide and sulfur dioxide, the absorber means comprising at least a first reactor and a second reactor, each of the first reattor and the second reactor containing the zinc oxide sorbent; the apparatus further comprising:
regeneration means for producing a heated regeneration stream effective for regeneration of the zinc oxide sorbent and for introducing oxygen-containing gas into a reactor during regnration;
switching means in flow communication with the Claus conversion means and with the regeneration means for placing the first reactor on sorption and the second reactor on regeneration and for placing the second reactor on sorption and the first reactor on regeneration, absorber effluent gas being produced from the reactor on sorption and regeneration effluent gas being produced from the reactor on regnration; and
means for connecting the reactor on sorption in flow comnunication with the reactor on regnration for providing absorber effluent gas to the reactor on regeneration.

6. Apparatus as in claim 5 wherein:
the Claus conversion means comprises a Claus furnace for thermally converting hydrogen sulfide in the presence of oxygen and for producing a furnace effluent stream containing sulfur, hydrogen sulfide, sulfur dioxide, and said reducing species; and
the Claus conversion means further comprises at least one Claus catalytic reactor for receiving the furnace effluent stream and for converting hygrogen sulfide and sulfur dioxide in the furnace effluent stream to sulfur and condenser means for removing elemental sulfur and producing the effluent stream provided to the absorber means.

7. Apparatus as in claim 6 wherein:
the conversion means comprises a Claus plant having at least three Claus catalytic reactors having associated condenser means.

8. Apparatus as in claim 6 further comprising:
flow means in flow communication with the reactor on regeneration for receiving regeneration effuuent gas and for returning regeneration effluent gas to the conversion means.

9. In an Apparatus for the recovery of sulfur from a gaseous stream comprising hydrogen sulfide, the apparatus comprising
absorber means for receiving the gsseous stream comprising hydrogen sulfide and for removing hydrogen sulfide therefrom in the presence of a zinc oxide sorbent and form producing an absorber effluent stream reduced in content of hydrogen sulfile, the absorber means comprising at least a first reactor and a second reactor, each of the first reactor and the second reactor containing the zinc oxide sorbent; and the apparatus further comprising,
regeneration means for producing a heated regeneration stream effective for regeneration of the zinc oxide sorbent and for introducing oxygen-containing gas into a reactor during regeneration,
switching means for placing the first reactor on sorption and the second reactor on regeneration and for placing the second reactor on sorption and the first reactor on regeneration, absorber effluent gas being produced from the reactor on sorption and regeneration effluent gas being produced from the reactor on regeneration, the improvement comprising:
means for connecting the reactor on sorption in flow communication with the reactor on regeneration and for providing absorber effluent gas to the reactor on regeneration.

* * * * *

UNITED STATES PATENT AND TRADEMARK OFFICE
CERTIFICATE OF CORRECTION

PATENT NO. : 4,793,976
DATED : December 27, 1988
INVENTOR(S) : Min-Hsuin Lee

It is certified that error appears in the above—identified patent and that said Letters Patent is hereby corrected as shown below:

Column 1, line 56, "(SO2)" should be --$(SO_2)$--.

Column 1, line 57, "sllfur" should be --sulfur--.

Column 2, line 26, "sufiiient" should be --sufficient--.

Column 3, line 13, after "sulfide" insert --,--.

Column 4, line 30, "on" should be --one--.

Column 5, line 12, after "three" insert a hyphen (-).

Column 5, line 27, "t" should be --to--.

Column 5, line 55, "zone((furnace)" should be --zone (furnace)--.

Column 6, line 18, should read, "ous effluent streams are shown in the Table below. The".

Column 7, line 47, "hydrogenatinn" should be --hydrogenation--.

Column 8, line 21, "foom" should be --from--.

Column 8, line 22, "8800" should be --800--.

Column 8, line 46, "Hydrogenatin" should be --Hydrogenation--.

Column 8, line 61, "oxdde" should be --oxide--.

Column 9, line 28, "hydrognn" should be --hydrogen--.

Column 9, line 41, "sulfatecca" should be --sulfate can--.

Column 9, line 60, "eelatively" should be --relatively--.

Column 11, line 25, "oeerated" should be --operated--.

Column 11, line 34, "lan" should be --lean--.

Column 12, lines 13 and 14, "determied" should be --determined--.

Column 12, line 39, "mmol %" should be --mol%--.

UNITED STATES PATENT AND TRADEMARK OFFICE
CERTIFICATE OF CORRECTION

PATENT NO. : 4,793,976
DATED : December 27, 1988
INVENTOR(S) : Min-Hsuin Lee

It is certified that error appears in the above—identified patent and that said Letters Patent is hereby corrected as shown below:

Column 13, lines 22 and 23, "fibergass" should be --fiberglass--.

Column 13, line 26, "compayy" should be --company--.

Column 13, line 28, "aas" should be --gas--.

Column 16, line 33, "suffide" should be --sulfide--.

Column 16, line 68, "eflluent" should be --effluent--.

Column 17, line 27, "effleent" should be --effluent--.

Column 20, line 9, "lll" should be --all--.

Column 20, line 38, "fo" should be --for--.

Column 20, lines 38 and 39, "regneration" should be --regeneration--.

Column 20, line 41, "regneration" should be --regeneration--.

Column 20, line 43, "regneration" should be --regeneration--.

Column 20, line 48, "regneration" should be --regeneration--.

Column 20, line 52, "abosrber" should be --absorber--.

Column 21, line 24, "absorer" should be --absorber--.

Column 21, line 28, "reattor" should be --reactor--.

Column 21, line 45, "comnunication" should be --communication--.

Column 21, line 45, "regneration" should be --regeneration--.

Column 22, line 6, "hygrogen" should be --hydrogen--.

Column 22, line 17, "effuuent" should be --effluent--.

Column 22, line 23, "gsseous" should be --gaseous--.

UNITED STATES PATENT AND TRADEMARK OFFICE
CERTIFICATE OF CORRECTION

PATENT NO. : 4,793,976

DATED : December 27, 1988

INVENTOR(S) : Min-Hsuin Lee

It is certified that error appears in the above-identified patent and that said Letters Patent is hereby corrected as shown below:

Column 22, line 28, "sulfile" should read --sulfide--.

Signed and Sealed this

Thirteenth Day of February, 1990

Attest:

JEFFREY M. SAMUELS

*Attesting Officer*     *Acting Commissioner of Patents and Trademarks*